Feb. 14, 1950     T. O. MEHAN ET AL     2,497,784
CALCULATING MACHINE AND REMOTE
CONTROL MECHANISM THEREFOR
Filed May 15, 1944     12 Sheets-Sheet 1
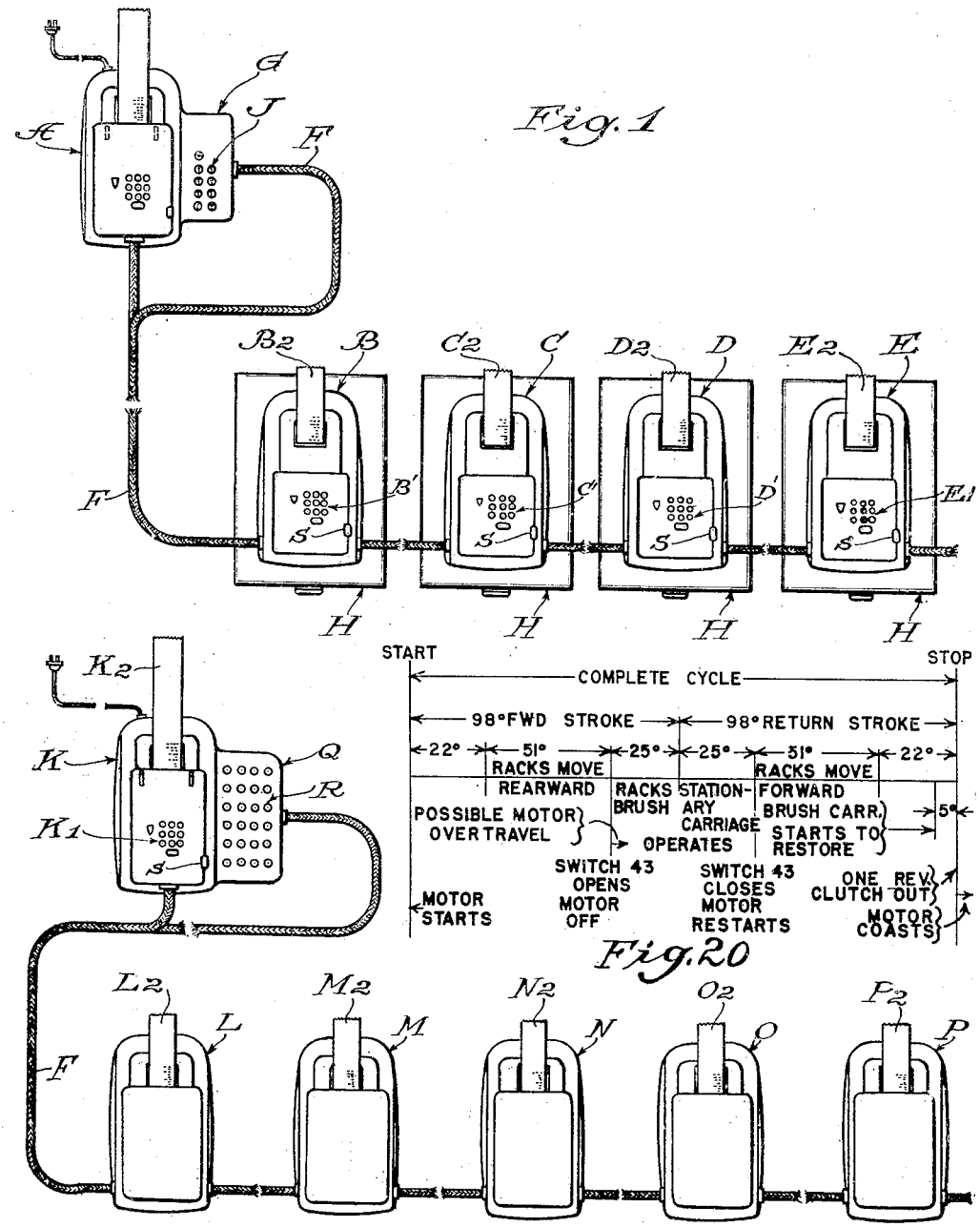
INVENTORS
Thomas O. Mehan
Hunter E. Hooe
BY
Williams, Bradbury & Hinkle
ATTORNEYS.

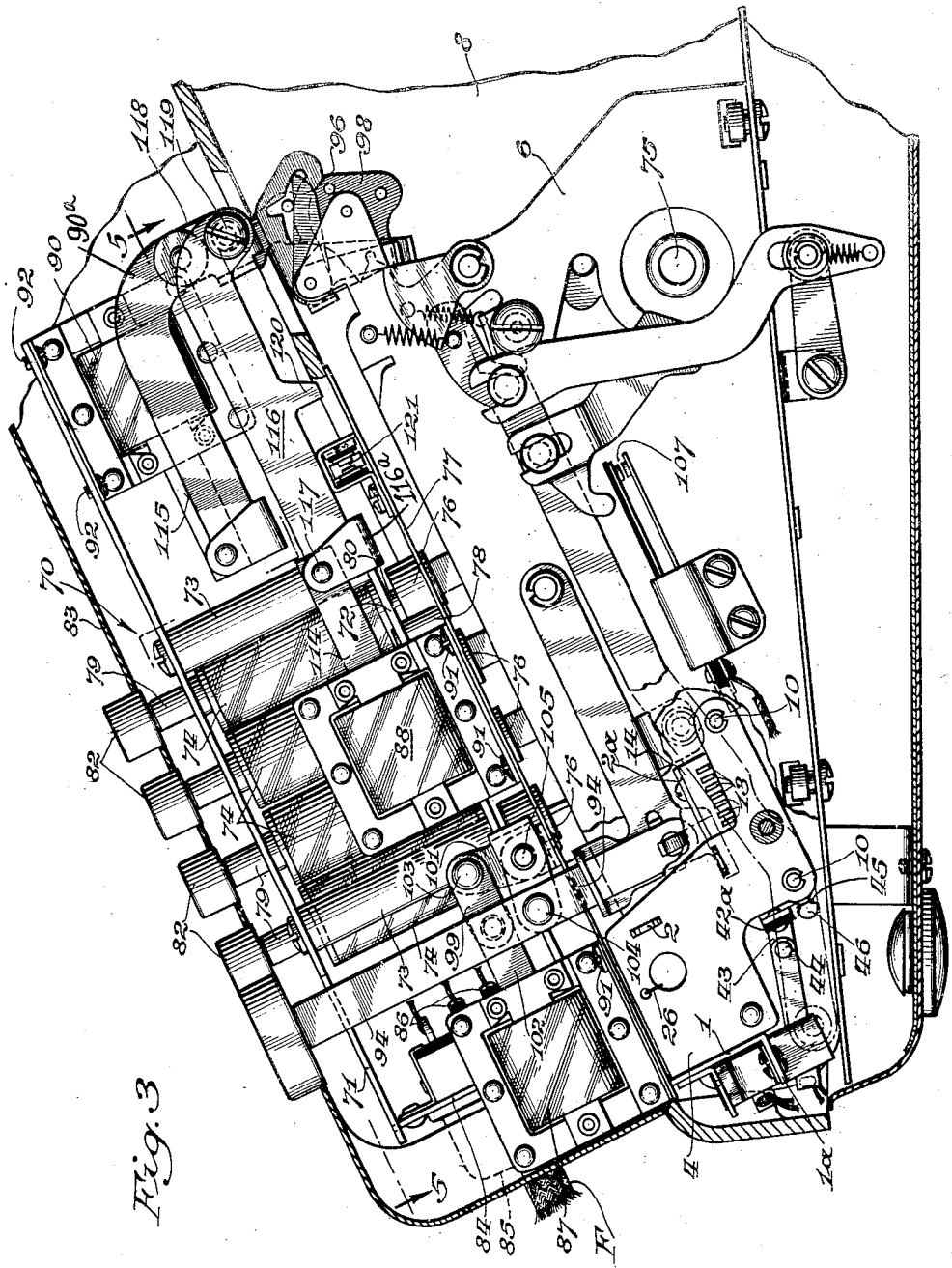

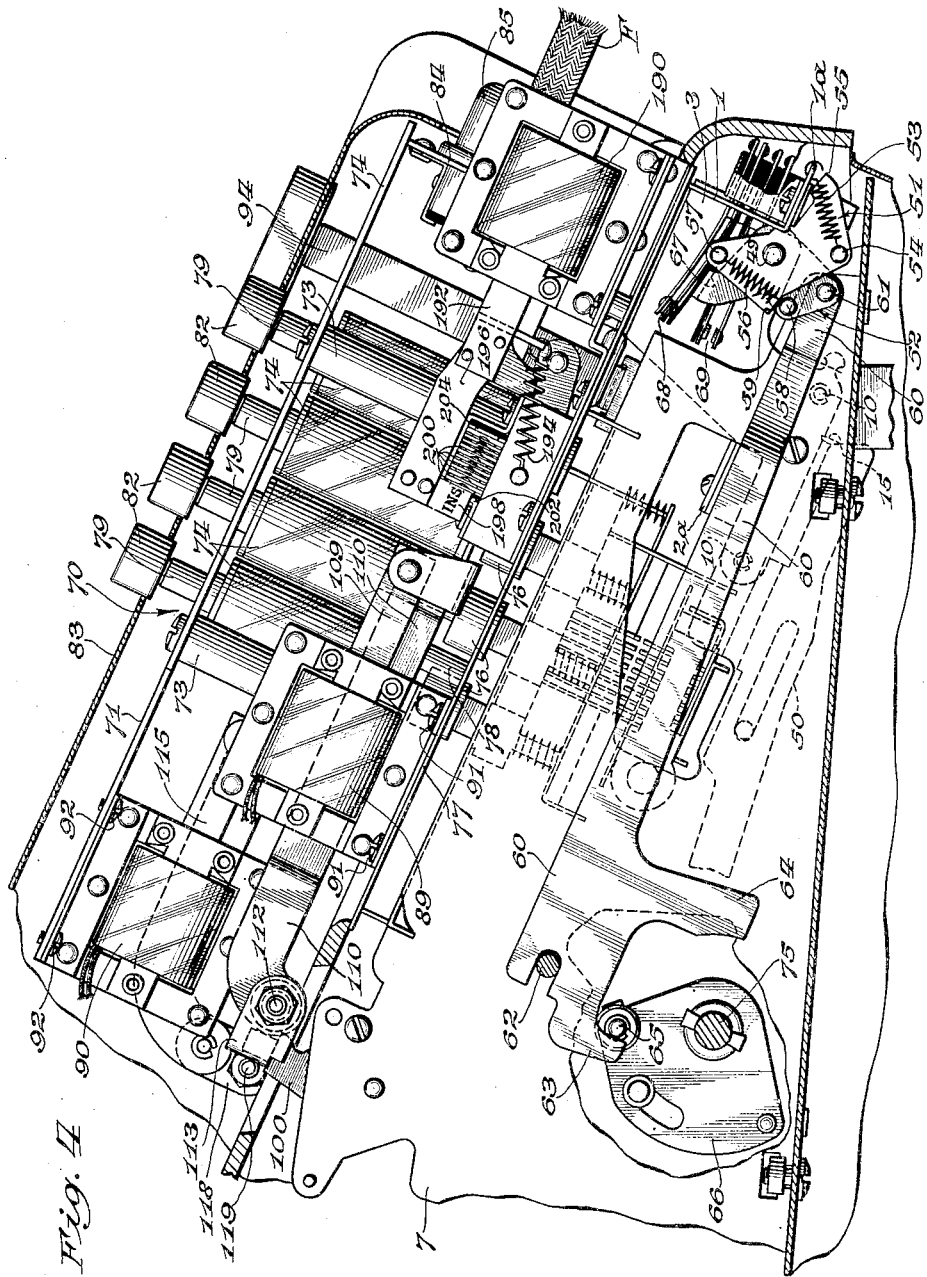

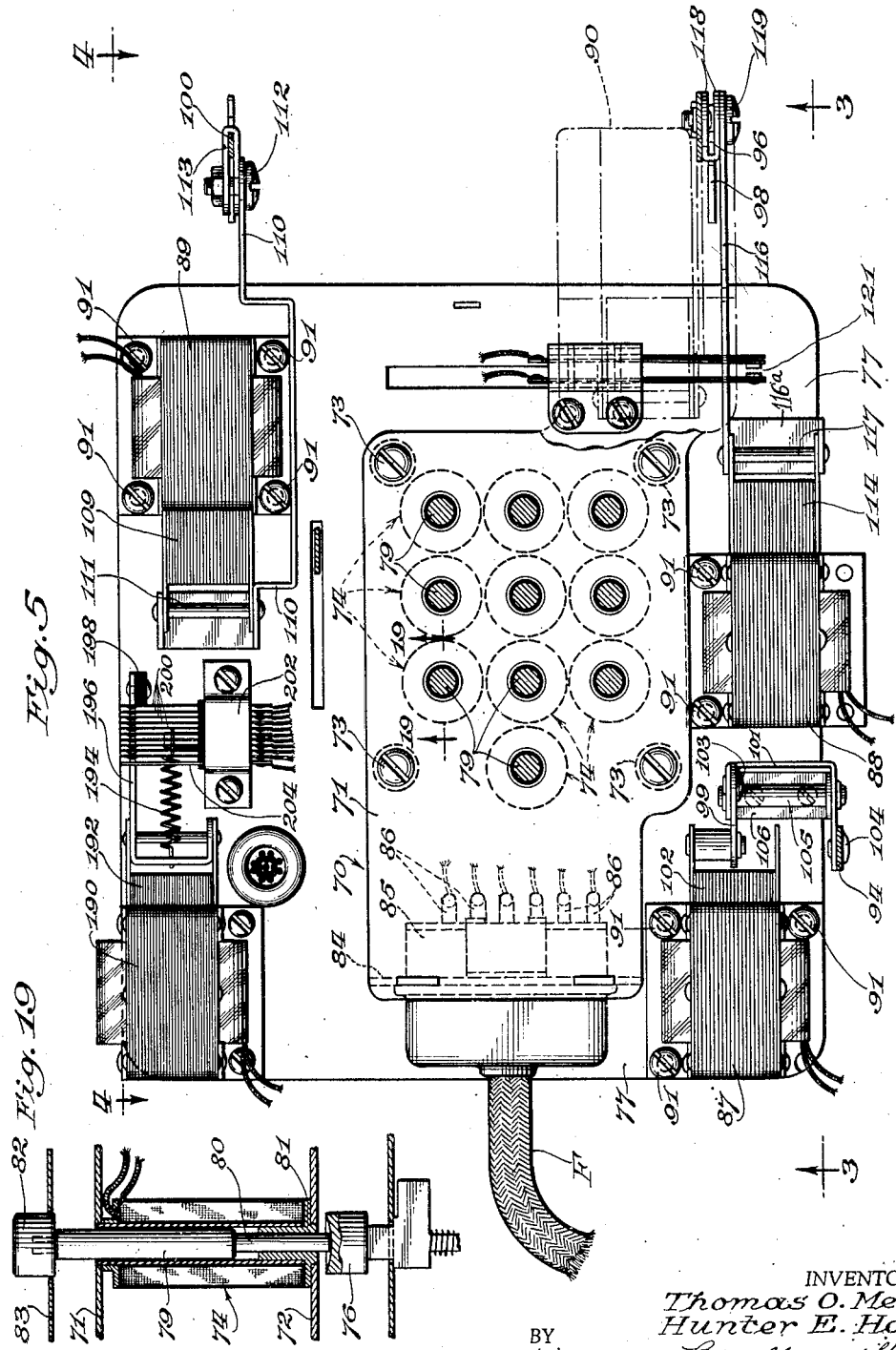

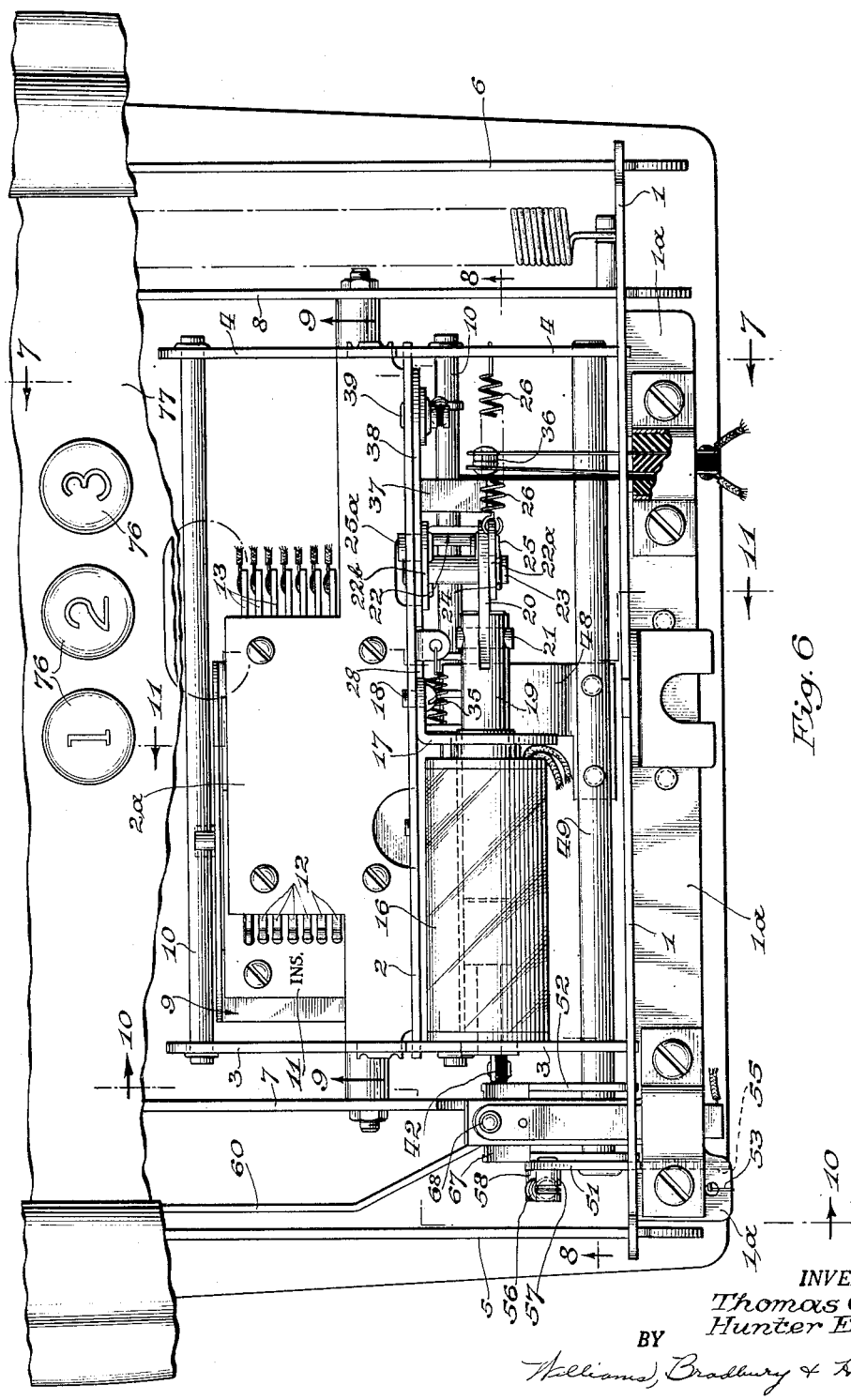

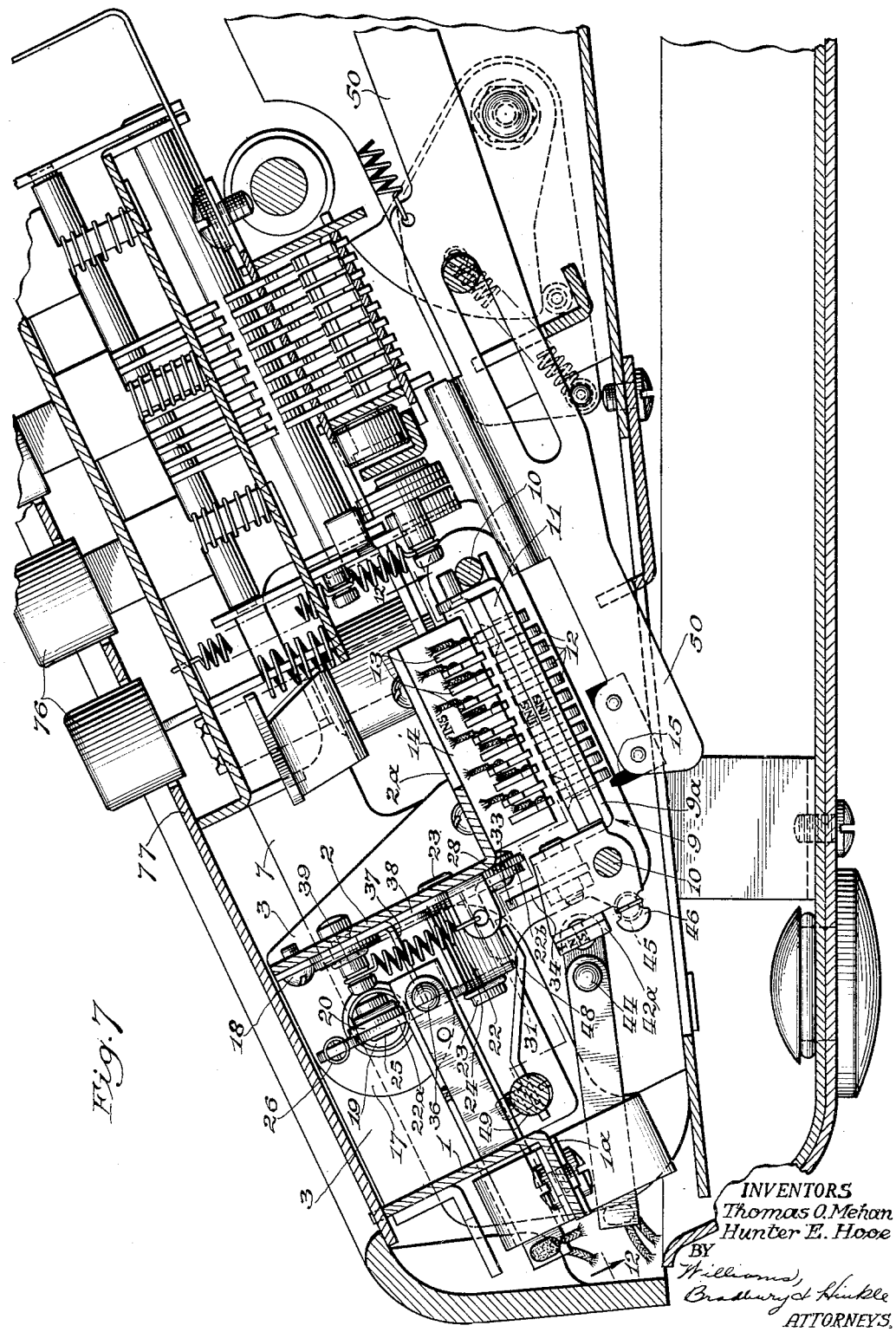

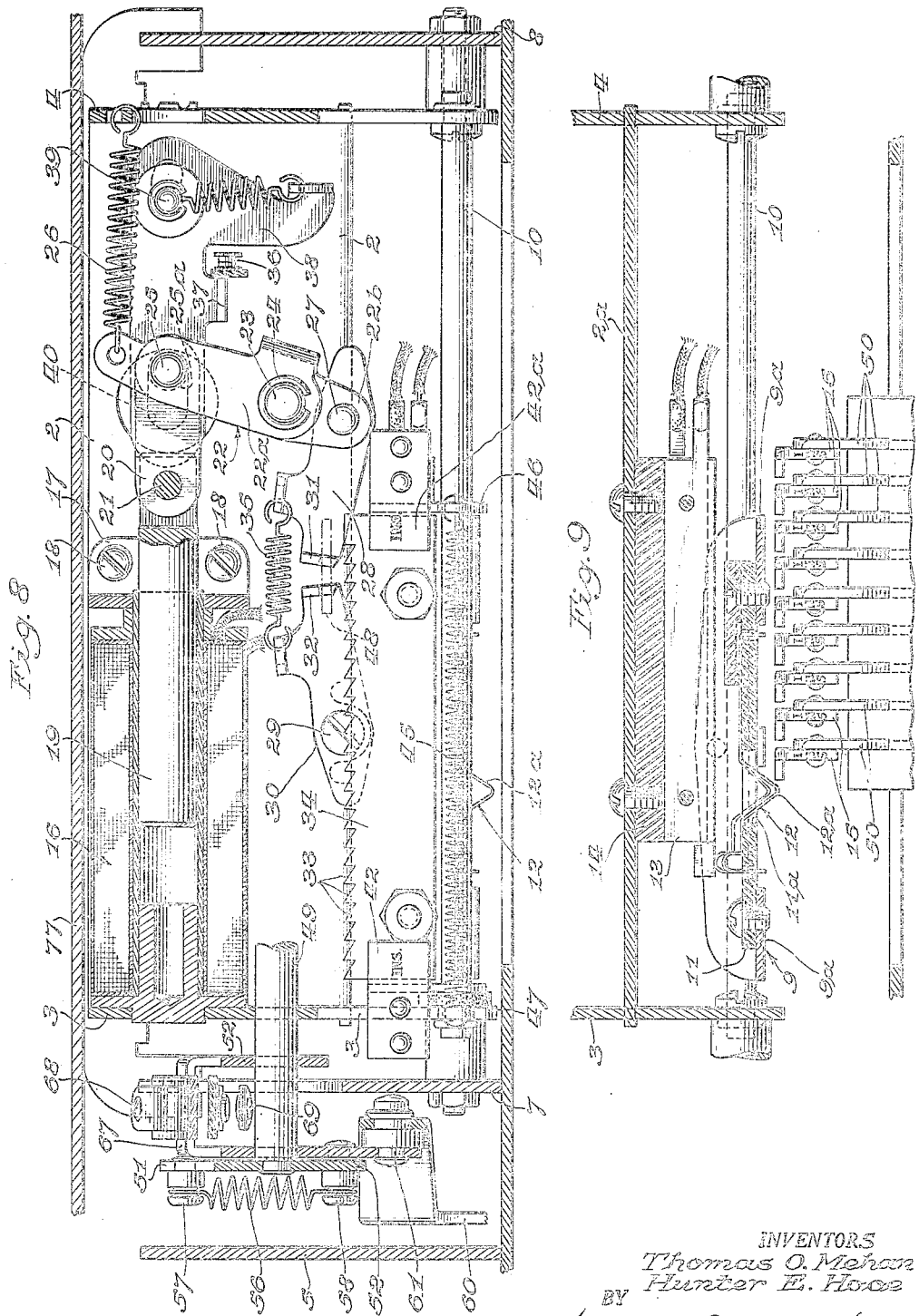

Feb. 14, 1950

T. O. MEHAN ET AL  
CALCULATING MACHINE AND REMOTE  
CONTROL MECHANISM THEREFOR 2,497,784

Filed May 15, 1944

INVENTOR.  
Thomas O Mehan  
Hunter E. Hooe  
BY Williams, Bradbury & Hinkle  
ATTORNEYS.

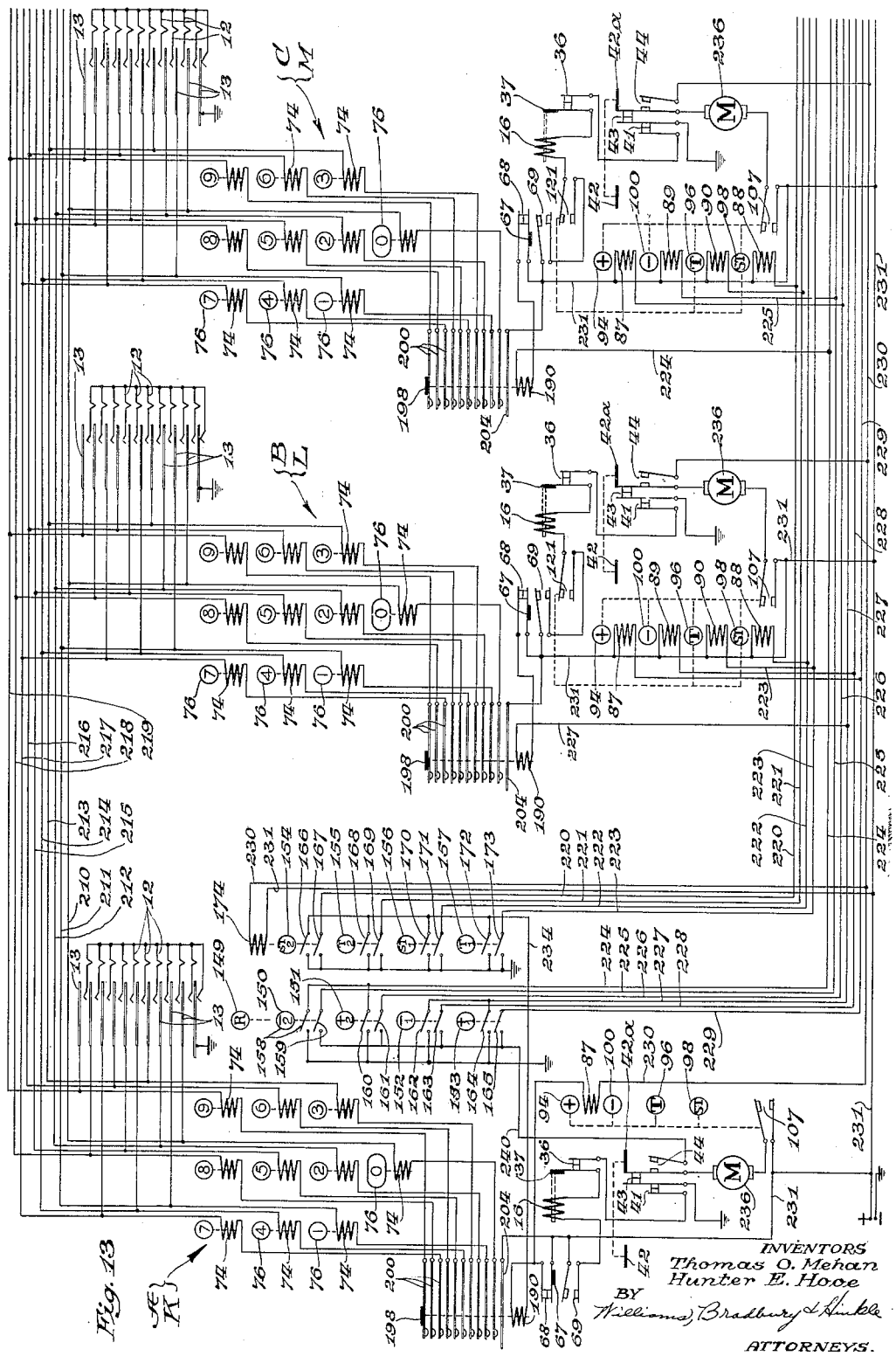

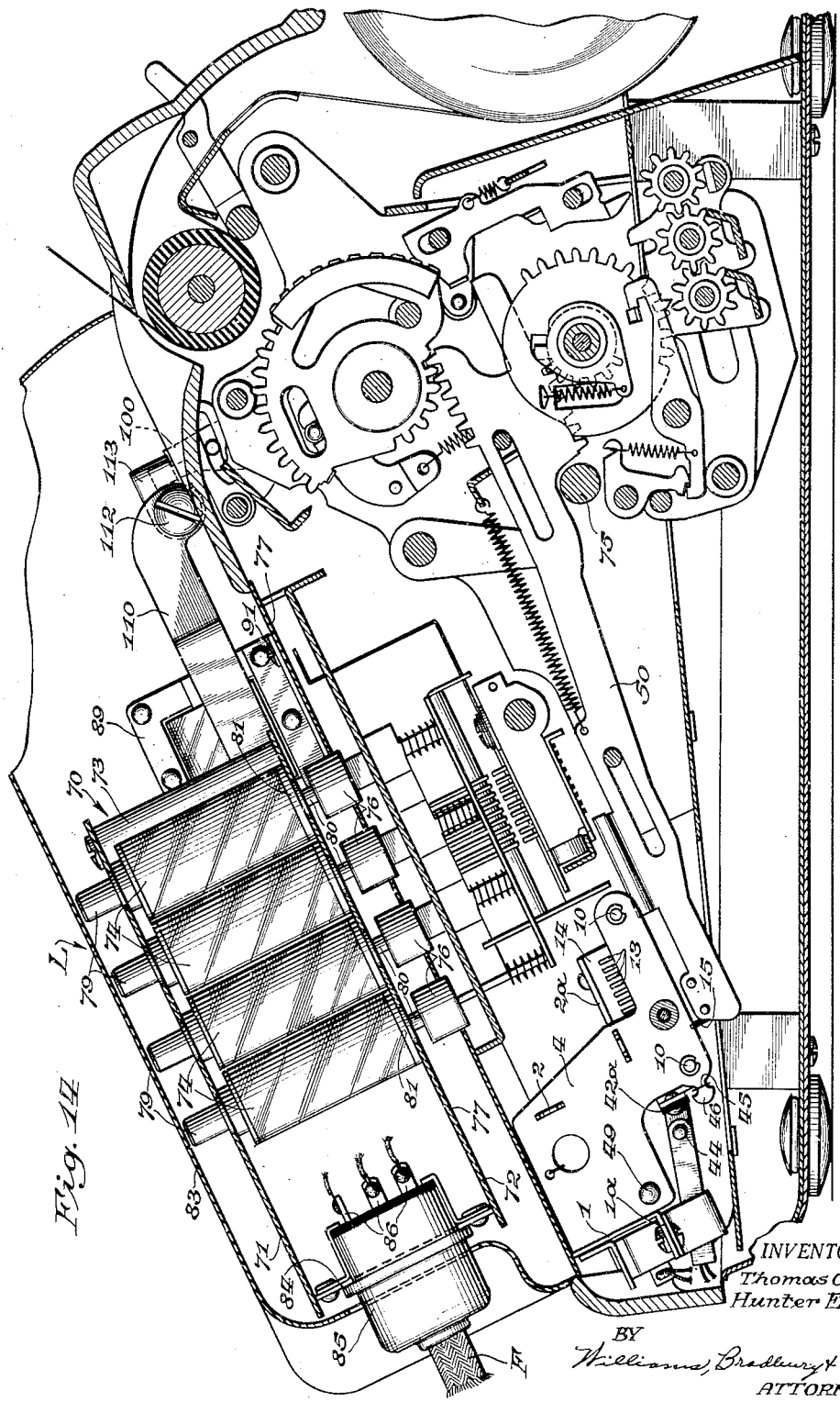

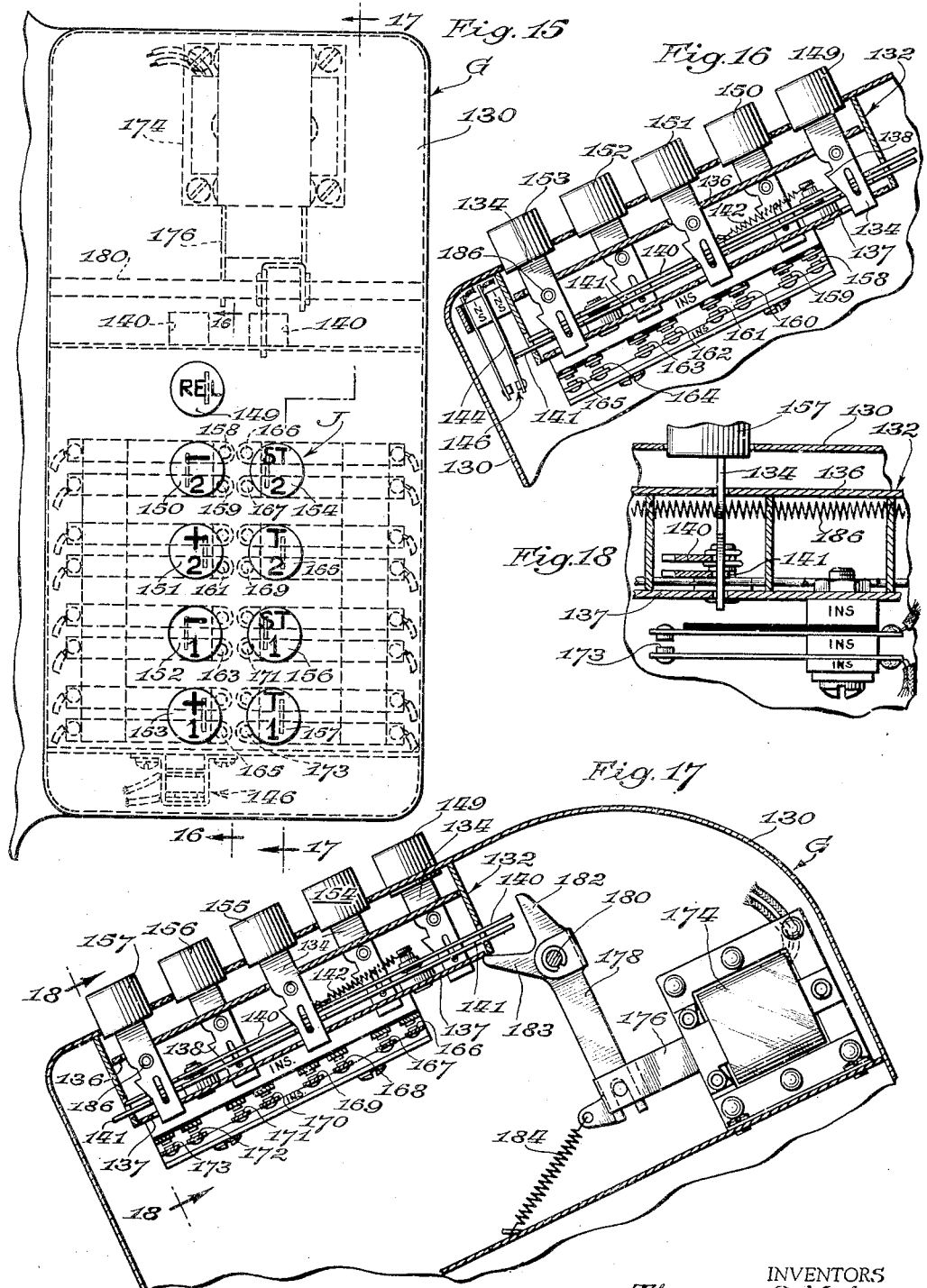

Patented Feb. 14, 1950

2,497,784

UNITED STATES PATENT OFFICE 2,497,784

CALCULATING MACHINE AND REMOTE CONTROL MECHANISM THEREFOR

Thomas O. Mehan, Park Ridge, and Hunter E. Hooe, Chicago, Ill., assignors to Victor Adding Machine Co., a corporation of Illinois Application May 15, 1944, Serial No. 535,574

9 Claims. (Cl. 235—60.31)

Our invention relates generally to accounting machines and apparatus, and more particularly to improved systems and apparatus for performing accounting operations through the use of remote control mechanisms.

In various businesses, such as in a department store, it is desirable that the accountant or comptroller be able rapidly to determine the amounts of sales of different categories or of different departments and to obtain printed records of the totals of such sales. At present it is the common practice to utilize individual cash registers in the various departments and at the end of the day to collect the record tapes from such cash registers and from these tapes, by suitable classification and segregation, to obtain the total sales in various significant categories. This involves a considerable amount of clerical work so that the comptroller or manager cannot have immediately available the sales figures on which to base his decisions as to purchases, etc.

It is therefore an object of our invention to provide an improved accounting system and apparatus whereby totals of sales of various categories or departments may be obtained substantially instantaneously at any time.

A further object is to provide an improved apparatus for performing operations similar to ledger posting to obtain cumulative net totals of items of different categories or classifications.

A further object is to provide an improved adding and listing machine capable of remote control, the accumulations of which may be remotely registered and recorded.

A further object is to provide an improved accounting system and apparatus utilizing individual adding machines of basically standard construction and providing electrical control circuits and mechanisms whereby such machines may be utilized as transmitters or receivers in mechanical accounting systems.

A further object is to provide an improved electrical means for sensing the amount accumulated in an adding and listing machine.

A further object is to provide an improved control circuit whereby the amounts accumulated in an adding and listing machine may be transferred to another adding and listing machine.

A further object is to provide an improved electrical means for operating an adding and listing machine from a remote control station and, at said remote control station, making a record of the total of items accumulated in such adding machine, through the operation of electrical sensing means.

Other objects will appear from the following description, reference being had to the accompanying drawings, in which:

Fig. 1 is a diagrammatic view illustrating a master machine and a plurality of secondary machines embodying our improved remote control mechanisms, such machines being arranged to illustrate a typical department store installation;

Fig. 2 is a similar diagrammatic view showing the machines embodying our invention arranged to illustrate an installation especially adapted for sales analysis;

Fig. 3 is a right side elevational view of the front portion of a master machine with the case and base appearing in vertical section, and showing particularly a transmitter unit and receiver unit incorporated therein;

Fig. 4 is a left side elevational view of the front portion of the master machine;

Fig. 5 is a plan view of a receiver unit mounted upon the keyboard cover plate of a master machine and showing particularly the solenoids for actuating the subtract key, total key, and motor bar key of such machine;

Fig. 6 is a fragmentary plan view of the front part of a departmental or master machine with parts broken away to show the transmitter unit assembly;

Fig. 7 is a vertical longitudinal section of a departmental machine taken on the line 7—7 of Fig. 6 and shown to an enlarged scale;

Fig. 8 is a transverse vertical section of the transmitter unit taken on the line 8—8 of Fig. 6;

Fig. 9 is a transverse vertical section through the transmitter unit, taken on a plane corresponding to the line 9—9 of Fig. 6;

Fig. 13 is a schematic wiring diagram of the electrical control circuits for a master machine and two secondary machines;

Fig. 14 is a right side elevational view of the secondary adding and listing machine, with some parts appearing in vertical section and still other parts omitted for the sake of clearness;

Fig. 15 is a fragmentary plan view of a selection key control box forming part of the master machine;

Figure 10:
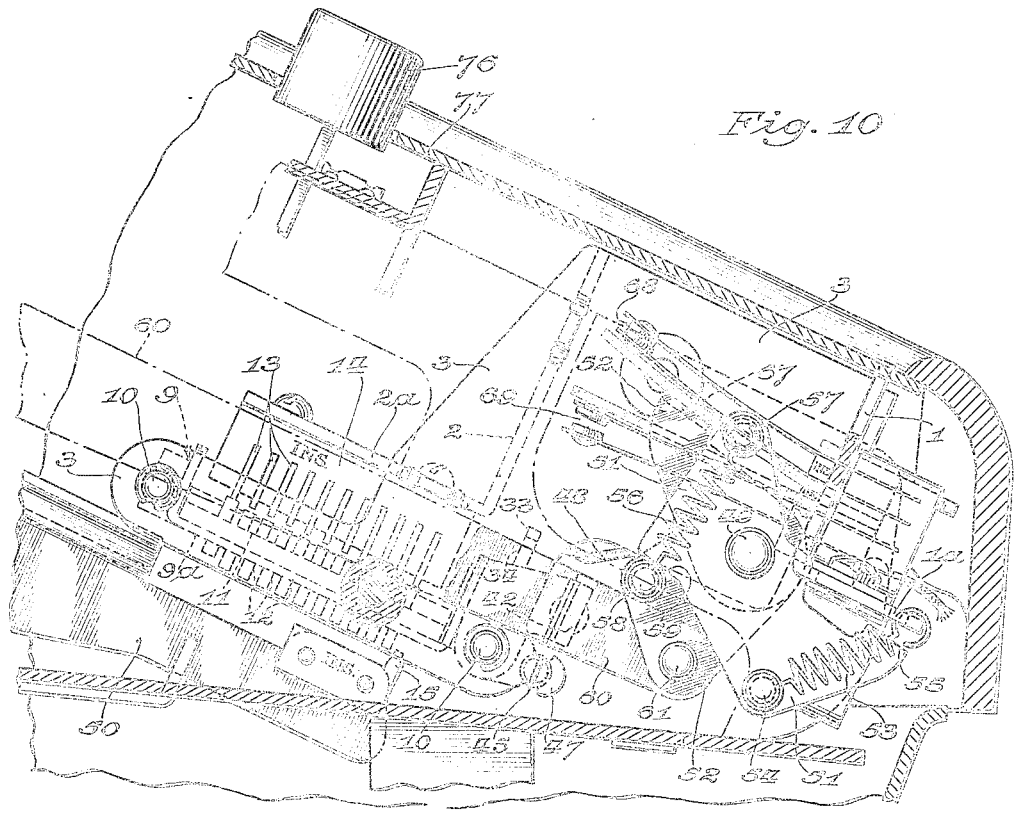
Fig. 10 is a left side elevational view of the transmitter unit of a departmental machine, shown to an enlarged scale, with parts of the machine shown in section taken on broken line 10—10 of Fig. 6.
Figure 11:
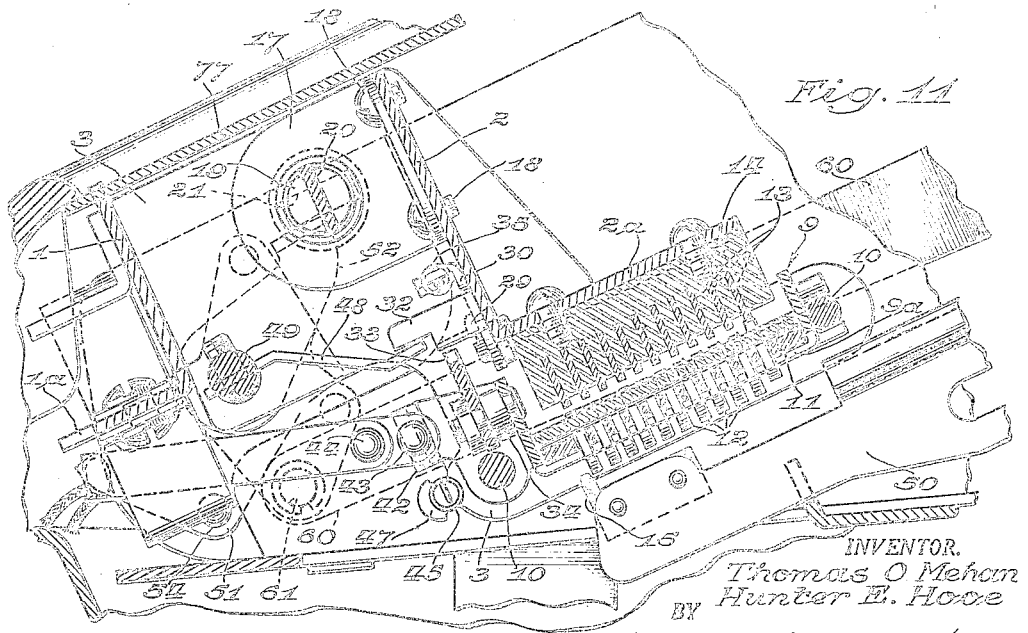
Fig. 11 is an enlarged vertical section through the transmitter unit taken on the line 11—11 of Fig. 6.

Figs. 16 and 17 are fragmentary vertical sectional views taken on the lines 16—16 and 17—17, respectively, of Fig. 15;

Fig. 18 is a fragmentary sectional view taken on the line 18—18 of Fig. 17;

Fig. 19 is a central vertical sectional view of a solenoid operated key; and

Fig. 20 is a timing diagram showing the sequence of operation of various parts of the apparatus.

General description

It is believed that the detailed description of our improved remote control mechanism will be more readily understood if it is read with a general knowledge of the functions to be performed and the general manner in which the objects of the invention are attained.

There are disclosed herein two forms of the invention. In the first form there is provided a plurality of departmental adding and listing machines which may be distributed among the various departments of a business and which are provided with the usual amount keyboard and operating motor control key, but which are not provided with the usual total and subtotal taking keys. These departmental machines are electrically connected to a master machine which may be located in the comptroller's office. The electrical intercontrols between the master machine and the departmental machines are such that the departmental machines may be individually selected to cause them to execute total or subtotal taking operations while simultaneously transferring such subtotals or totals to the master machine. The individual departmental machines in which such subtotal and total operations are to be performed are selected by suitable key controlled mechanisms forming part of, or associated with, the master machine. The recording or printing apparatus of each departmental machine makes a complete record of all of the operations performed by such machine whether as a result of the direct manual operation of the machine or by remote control from the master machine, and similarly, a record is made by the master machine of all subtotal and total taking operations effected in the various departmental machines. A grand total may then be secured by a total taking operation of the master machine.

In the other embodiment of the invention, used for sales analysis and similar accounting problems, a plurality of conventional secondary adding and listing machines are selectively controlled from a single master adding and listing machine so that amounts entered in the latter may be selectively entered in one or more of the secondary machines and thus permit performance of operations similar to ledger posting, the system providing for taking totals or subtotals in the secondary adding and listing machines and transferring such totals or subtotals to the master machine. This latter system provides a simple, effective means for classifying and obtaining totals of items of different classes or categories.

The individual machines used in these two embodiments of the invention are in many respects similar. The master machines may be substantially identical. The departmental or secondary machines of the two systems might be of identical construction, but because of their different functions some are preferably provided with transmitter units only, while others are provided with both receiver and transmitter mechanisms.

One of the distinctive features of both systems is that the simple mechanisms of a ten-key type adding machine are employed in both the master machines and the departmental or secondary machines. Because of the use of machines of the ten-key type the number of electrical connections required for transmitting key operations and totals from one machine to another or others is greatly simplified.

The ten-key adding and listing machine mechanism preferably used as parts of both the master, departmental, and secondary machines is that disclosed in the copending application of Thomas O. Mehan, Serial No. 566,980, filed December 7, 1944, which has matured into Patent No. 2,486,959. Said application Serial No. 566,980 is a division of abandoned application Serial No. 313,896, filed January 15, 1940. Most of the essential parts of such ten-key adding machine are shown herein, particularly in Fig. 14, but are not described in detail because the machine is of the well known "Victor" type.

In Fig. 1, there is shown diagrammatically a system employing a master adding and listing machine and four departmental machines representative of any desired number which may be employed. In this figure A designates a master machine, i. e., a machine which is arranged electrically to collect, and accumulate totals and subtotals derived from the departmental machines designated B, C, D, E. The master machine may be located in an executive's office, such as that of the comptroller of the department store, while machines B, C, D and E are assumed to be located in various departments, as the notions, dress goods, men's furnishings, and china departments, respectively. A multi-conductor cable F connects the master machine with the departmental machines. The control circuits provided in part by the conductors of this cable will be more fully explained in connection with the wiring diagram of Fig. 13. G represents a selection key control box, which is associated with the master machine A and serves as the means for selecting which of the machines B, C, D, or E is to be controlled.

As diagrammatically illustrated in Fig. 1, each of the departmental machines may be mounted upon a cash drawer base H. In operation, the clerk or clerks, of the china department, for example, list and accumulate each sale made by setting up the amount of such sale in the keyboard E1 and printing it upon the tape E2. This same procedure is followed in each of the other departments, thus listing the individual sales upon the tapes B2, C2, and D2, for their respective departments.

Let us assume that the executive in charge of the master machine A desires to learn the amount of the sales made in the china department, to ascertain the response to an advertisement, or to determine what stock he should order, or for any other purpose for which this information may be needed. If he does not wish to clear machine E, he may take a subtotal and transfer this to the master machine A by manipulation of the proper selector keys J, or he may clear machine E by transferring its total to the master machine A. Similarly, the comptroller or operator of the master machine may transfer to the master machine the totals or subtotals from any or all of the other departmental machines by actuation of the proper selection keys J. It will be noted that departmental machines B, C, D, and E are each provided with a motor bar S to initiate an operating cycle, but that these machines do not have exposed control keys for total or subtotal taking operations. While only four departmental machines are illustrated, it will be understood that any reasonable number may be coupled in a single system.

In Fig. 2 the machines are arranged in a system for sales analysis. The machine designated K is the master machine and controls secondary machines L, M, N, O, and P. The master machine K has a selection key control box Q, with control keys R, associated therewith.

As a hypothetical case, let it be supposed that Mr. Doe and Mr. Roe are automobile salesmen and that machine L is to be used to enter all sales made by Doe, machine M for all sales made by Roe, and that machines N, O, and P are used to enter sales of three different car models or price ranges.

With the apparatus of Fig. 2, an operator can set up the amount of a sale made by Doe in the master machine keyboard K', and, by depressing the correct selection keys R in control box Q, such amount can be electrically entered into machine L which accummulates Doe's sales, and in the proper machine N, O, or P, depending upon the model or the price range of the car sold. When all sales have been entered in the master machine K and also recorded in the proper machines L to P, respectively, the totals from machines L to P can be electrically transferred to the master machine and printed on the master tape K2. Thus, the individual totals or subtotals of sales made by Doe and Roe, as well as the totals of each model sold, may be printed on their respective tapes L2 to P2, and at the same time transferred from machines L to P to the master machine K. These totals or subtotals may be printed on the tape K2 and entered in the accumulator of master machine K for subsequently taking a grand total.

From the foregoing it will appear that the master, departmental, and secondary machines may be of generally similar construction, but due to their different functions may differ in the following respects. The master machine A includes, in addition to conventional adding and listing mechanisms, the following: (1) a control box G with its keys J for selecting the departmental machine from which the total or subtotal is to be taken; (2) electromagnetic means for operating the amount keys under the control of the selected departmental machine during total and subtotal taking operations; (3) electromagnetic means controlled by the selected departmental machine, for initiating an adding operation in the master machine.

Each of the departmental machines B, C, D, and E, comprises conventional adding and listing machine mechanisms with the following differences: (1) these departmental machines have no exposed total, subtotal, or subtract control keys; (2) they are provided with sensing means capable of determining the totals accumulated in their accumulators; (3) they are provided with electromagnetic means for selectively initiating subtotal and total taking operations.

In the embodiment of Fig. 2, the master machine K comprises the conventional mechanisms of a ten-key adding and listing machine and the following: (1) a control box Q with control keys R for selecting which of the secondary machines L to P are to be operated, and determining whether such operations shall be adding, subtracting, subtotaling, or total taking operations; (2) a sensing mechanism for determining the amount being added in the accumulator of the machine K; (3) electromagnetic means for interrupting the operating cycle of the machine K to allow time for the performance of the sensing operation; (4) electromagnetic means for setting up amounts on the keyboard of the machine K in the operation of electrically transferring totals or subtotals from the secondary machines L to P to the machine K.

Each of the secondary adding and listing machines L to P comprises the conventional mechanisms of a ten-key adding and listing machine, with the following differences: (1) there are no manually operable keys, but instead electromagnetic means are provided to set up the amounts to be added or subtracted; (2) electromagnetic means are provided for initiating an operating cycle and determining its character; (3) the sensing means are provided for furnishing electrical signals representing the amount accumulated, for transmission to the master machine K.

*The transmitter or sender unit*

The transmitter or sender units forming parts of the departmental machines B to E, of the master machine K and of the secondary machines L to O may be substantially identical. The transmitter or sender unit shown in Figs. 3, 4, 6, 7, 8, 10, and 12, is therefore intended as illustrating the sender unit, or transmitter, of the different machines in which it is employed, although for the sake of reducing the number of illustrations required the sender unit is shown as a part of different machines in these figures.

The sender unit, as illustrated in Figs. 6 and 7, comprises a frame consisting of transverse vertical frame plates 1 and 2 which are held in spaced apart relation by end plates 3 and 4. This frame is supported by the outer frame plates 5 and 6 and intermediate frame plates 7 and 8 of the calculating machine in such manner that the transmitter can be installed or removed as a complete unit.

A brush carriage, designated generally by reference numeral 9, is mounted for transverse reciprocatory movement upon a pair of rails 10 carried by the end plates 3 and 4 respectively. This carriage comprises a generally U-shaped frame 9a (as best shown in Fig. 7), to which is secured an insulating brush holder 11 for the brushes 12. In the embodiment disclosed, there are eleven of these brushes, and each lies directly beneath an associated bus bar 13 (Fig. 9). These bus bars are mounted in an insulated block 14, which is fastened to the bottom surface of horizontal shelf portion 2a secured to frame plate 2 (Fig. 9). Each of the brushes 12 has a downwardly extending V-shaped portion 12a, which projects through aligning openings 11a formed in the brush holder 11. All except one of the V-shaped portions 12a of these brushes are adapted, in the course of movement of the carriage, to engage and to be flexed upwardly by insulating lugs 15 secured to actuator racks 50 and thereby sense the positions of these racks. One of the brushes 12 is formed so as to contact its bus bar 13 at all times.

*Transmitter carriage feed*

Means are provided for progressively moving the brush-carriage 9 from left to right, or in a direction from its normal position shown in Figs. 8 and 9 toward the end plate 4. This means comprises a solenoid 16, which is carried by the end plate 3 and L-shaped bracket 17, the latter being fastened to plate 2 by screws 18. The exposed end of the plunger or armature 19 of the solenoid 16 is slotted to receive one end of a link 20, which is pivoted upon the pin 21 carried by said armature. The other end of link 20 is pivotally connected to a stud 25 projecting from the upwardly extending arm of the forward part 22a of dual feed bail or lever 22, said lever being pivotally mounted upon a stud 23 projecting forwardly from the plate 2, being retained thereon by a keeper 24.

The plunger 19 has a fairly close sliding fit in its guide so that its operation will be slightly retarded and cushioned due to a dashpot effect. When alternating current is used for energizing the solenoid 16, the plunger 19 is preferably laminated, and in addition may be provided with electromagnetic retarding means.

The dual lever 22 is normally held in the position shown in Fig. 8 by a tension spring 26, one end of which is attached to the arm 22a of the lever 22, the other end being anchored to the end plate 4. The downwardly extending arm of the rearward part 22b of feed pawl lever 22 has a stud 27, which forms a pivot for feed pawl 28. Pivoted upon a stud 29, mounted on the plate 2, is a detent pawl 30. Projecting forwardly from the pawls 28 and 30 are arms 31 and 32, respectively, the lower edges of which are beveled to engage with the teeth 33 of a feed rack 34, the latter being bolted to the brush carriage 9. These pawls are normally urged into engagement with the teeth 33 by a spring 35 tensioned between ears bent from pawls 28 and 30.

The construction is such that whenever solenoid 16 is energized, its armature 19 will be drawn to the left (Fig. 8), which movement, through link 20, will rock the feed pawl lever 22 counterclockwise upon its pivot 23, and draw the feed pawl 28 to the right. This movement of pawl 28 in turn, through its arm 31, will move the feed rack 34, and hence the brush carriage 9, to the right a distance corresponding to one tooth of the rack 34. It will be noted that during this counterclockwise turning of feed pawl lever 22, spring 26 is being tensioned so that it will rock the arm 22 clockwise on its pivot 23 when the solenoid 16 is deenergized.

In order to energize and deenergize the solenoid 16 alternately, so as to move the brush carriage 9 progressively from left to right, there is provided a switch 36 (Fig. 6) in the solenoid circuit. This switch is carried by the shelf portion 1a of plate 1, being suitably insulated therefrom, and is normally held closed by an arm 37 projecting forwardly from a switch operating slide 38. As best shown in Figs. 6 and 8, this slide 38 is mounted for transverse sliding movement upon studs 25a and 39, the latter projecting forwardly from plate 2.

The stud 25a (Figs. 6 and 8) projects through a slot 40 to provide a lost motion connection between the arm 22b and the slide 38 to permit the armature 19 to rock the arm 22 a distance sufficient to move the brush carriage one step to the right, as previously explained, before the slide 38 is moved. When the stud 25a engages the left-hand end of slot 40, further movement of the armature 19 will shift the slide 38 to the left (Fig. 8) and its arm 37 will then permit separation of the contacts of switch 36, thus breaking the circuit to solenoid 16.

Figure 12:
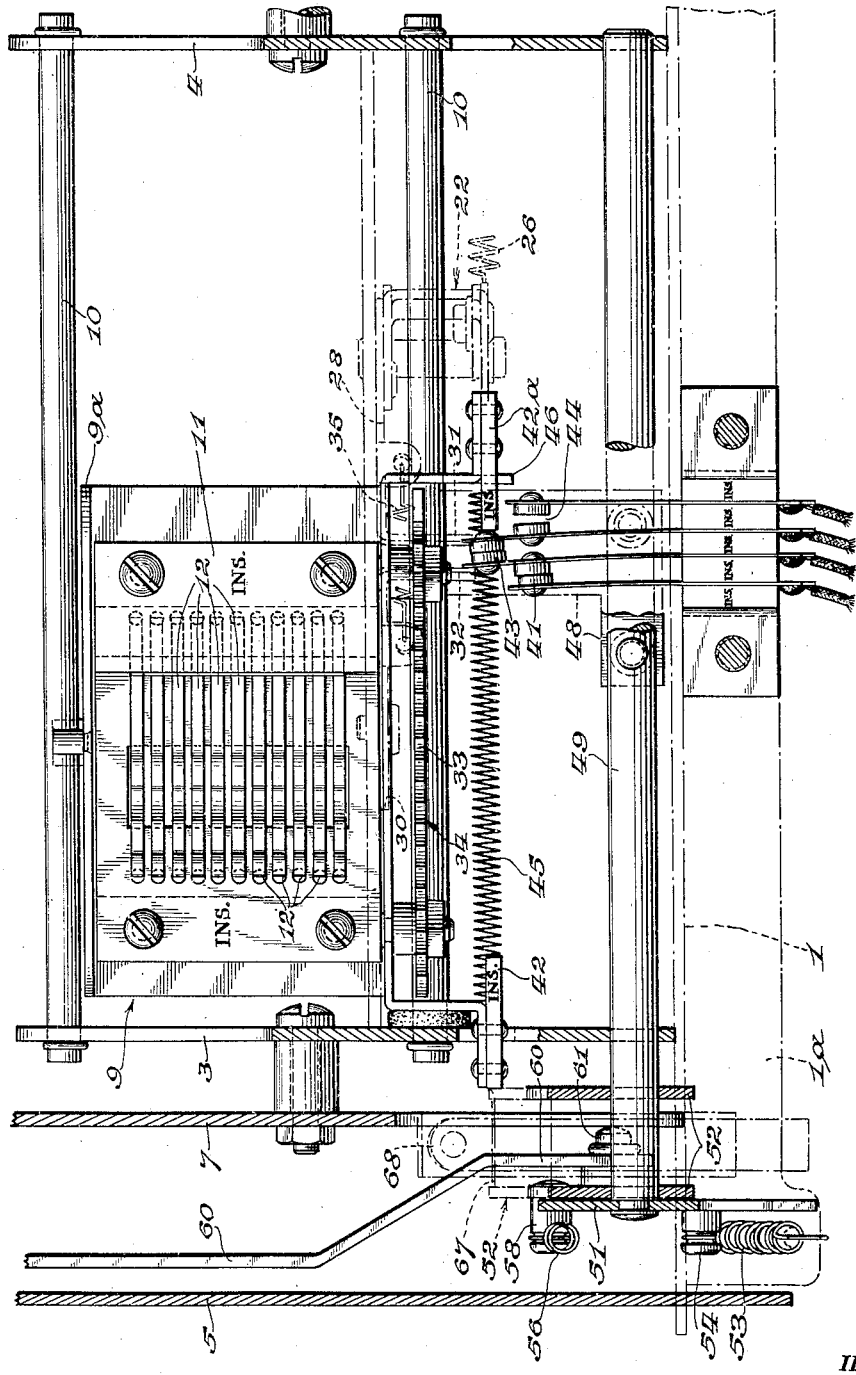
Fig. 12 is an enlarged horizontal section through the transmitter unit taken on the line 12—12 of Fig. 7, and showing particularly the transmitter brushes.

From the foregoing it will be understood that as soon as the solenoid 16 is deenergized, spring 26 will act to restore the lever 22 and associated parts to normal position, thus again closing switch 36. This alternate energization and deenergization of solenoid 16 causes the brush carriage 9 to be moved progressively from left to right for purposes later to be explained. Each time the pawl 28 is permitted to return to normal position under influence of spring 26, the detent pawl 30 prevents any retrograde movement of the brush carriage. It may be well to point out at this time that after the first energization of solenoid 16 takes place, the brush carriage 9 will be progressively moved from left to right as viewed in Figs. 8 and 12, until the solenoid circuit is broken by means other than the switch 36. This is accomplished by opening the solenoid circuit through a second solenoid switch 41 which is one of a group of three switches mounted beneath shelf portion 1a, as best illustrated in Fig. 12. As the brush carriage 9 nears its extreme right-hand position, an insulated arm 42 carried by said carriage opens switch 41 (thus opening the solenoid circuit) and closes switches 43 and 44 for purposes presently to be described.

The description thus far has traced the movement of brush carriage 9 from its normal left-hand position (Figs. 6-8 and 12) to its extreme right-hand position. In order to return brush carriage 9 to its normal left-hand position, there is provided a spring 45, one end of which is anchored to an ear 46 (Fig. 8) on the carriage and the other end of which is anchored to an ear 47 formed integrally with the end plate 3. It should be noted, however, that before spring 45 is permitted to return carriage 9 to its normal position, pawls 28 and 30 must be disengaged from the teeth 33 of rack 34. This is accomplished, at the proper time relative to the movement of adding racks 50 later to be described, by the following mechanism.

Referring to Figs. 6 and 8, a pawl disengaging plate 48, secured to a shaft 49, lies directly beneath the reduced ends of arms 31, 32 of pawls 28 and 30, respectively. The shaft is pivotally mounted in end plates 3 and 4 of the transmitter frame. One end of this shaft 49 extends beyond the end plate 3 (Figs. 4 and 6), having an arm 51 rigidly attached thereto and having a switch operating bail 52 pivotally mounted thereon, the latter being positioned between said arm 51 and end plate 3 as clearly shown in Fig. 8.

A spring 53 (Figs. 4 and 10) is connected between a stud 54 projecting from arm 51, and the shelf 1a of frame plate 1, and normally urges arm 51 in a counterclockwise direction as viewed in Fig. 4, such counterclockwise movement being limited when a nose 55 of said arm strikes the bottom surface of said shelf 1a. Another spring 56 is connected between a stud 57 on arm 51, and a stud 58 on switch bail 52, and normally urges said stud 58 towards a nose surface 59 of said arm 51. A control slide 60 has its forward end pivotally attached to switch operating bail 52 by a stud 61, and its rearward end slidably supported by a shaft 62. This slide also has downwardly projecting extensions 63 and 64 which are adapted to be engaged and moved by a stud 65 carried on plate 66 fixed to the main shaft 75 of the calculating machine.

When main shaft 75 is in its normal position, shown in Fig. 4, stud 65, contacting extension 63, holds the slide 60 rearwardly, thus stretching spring 53 and holding the nose 55 slightly spaced from shelf 1a. Under these conditions cross bar 57 of switch bail 52 holds switch 68 closed while switch 69 directly therebeneath is held open. Both switches 68 and 69 are mounted upon shelf portion 1a of frame plate 1 and suitably insulated therefrom as best shown in Figs. 4 and 6.

It will be seen that the initial part of the clockwise movement (Fig. 4) of main shaft 75, releases slide 60 and permits spring 53 to rock arm 51, and consequently switch bail 52, counterclockwise (Figs. 4 and 10) to open switch 68 preventing operation of a receiver unit in a manner to be explained hereinafter.

It will also be apparent that when stud 65 engages extension 64 of control slide 60, said slide will be driven forward sufficiently to cause cross bar 67 of bail 52 to close switch 69. It may therefore be pointed out that switch 69 is closed approximately 25° before (see Fig. 20) the end of the clockwise (Fig. 4) stroke of the main shaft 75, and that closure of this switch establishes an electric circuit for energizing solenoid 16 which in turn starts the brush carriage feed in the manner just previously described.

When the carriage has moved one tooth space to the right (Fig. 12), an insulated arm 42a carried thereby moves away from switch 43, allowing it to open. When this switch is opened the electric circuit to the calculating machine motor is opened and hence further movement of main shaft 75 and adding racks 50 is prevented until the brush carriage 9 has completed its entire travel from left to right to sense the stopped positions of adding racks 50, after which the calculating machine motor is restarted by closure of switch 43, all as will be more fully described hereinafter.

Near the end of the return stroke of the main shaft 75, the stud 65 engages projection 63, moving the slide 60 rearwardly, swinging arm 51 clockwise, and thus through the shaft 49 and disengaging plate 48, raising pawls 28 and 30 from engagement with teeth 33 and permitting spring 45 to return the carriage 9 to its normal position.

Receiver unit

Mention has already been made of the fact that certain of the machines are provided with both transmitter and receiver units. Referring particularly to Figs. 3, 4, 5, and 14 for a detailed explanation of one of the receiver units, designated generally by reference numeral 70, it will be seen that such units are mounted directly above the keyboard section of the illustrative adding and listing machine. In Fig. 14 the receiver unit is shown as applied to one of the secondary machines such as the machine L.

As shown in Fig. 4, the receiver unit 70 is illustrated as part of a master machine such as the machine A or K, and comprises upper and lower solenoid support plates 71 and 72 respectively, which are joined in spaced relation by tie studs 73. Rigidly mounted between these plates are a plurality of solenoids 74 (ten in the unit here shown), one for each of the spring returned numeral keys 76. The lower solenoid support plate 72 is supported by and spaced from the conventional keyboard cover plate 77, as by spacing studs 78 (Fig. 4) a distance sufficient to accommodate the numeral keys 76. Each solenoid 74 is positioned directly above its corresponding numeral key 76 as clearly illustrated in Fig. 19. As shown in this figure each solenoid 74 is provided with an armature 79 of magnetic material, and a plunger 80, which is preferably non-magnetic and slidably supported in the bottom solenoid bushing 81. Each of the plungers 80 has its lower end resting upon its associated numeral key 76 and its upper end supporting the armature 79. In the master machines A and K a key button 82 may be secured to the upper end of armature 79, the key projecting above the receiver cover 83 as clearly shown in Figs. 3 and 4. This button 82 may be manually depressed for setting its corresponding numeral key 76, or the key 76 may be depressed by energization of its associated solenoid 74 by an electric impulse received from a remotely located departmental or secondary machine.

Rigidly mounted in end plate 84 (Fig. 14), attached to the forward end of support plates 71, 72, is a multiple prong connector 85 having a plurality of rearwardly projecting terminal lugs 86 which are connected to solenoids 74 by suitable conductors shown only in the wiring diagram, Fig. 13.

Referring to Figs. 3, 4, and 5, it will be observed that solenoids 87, 88, and 89 (Fig. 5) are securely attached to the keyboard cover plate 77 by screws 91, and that solenoid 90 (Fig. 3) is securely attached to the underside of plate 71 by screws 92. When these solenoids 87, 89, 88, 90 are energized by electric signals sent from a remotely located departmental or secondary machine, they actuate the add key 94, subtract key 100, total key 96, and subtotal key 98, respectively.

As clearly shown in Figs. 3 and 5, the armature 102 of solenoid 87 is pivotally connected to one end of a link 99, and the other end of said link is pivotally connected to one branch of a bell crank bail 101 by a stud 103. The other branch of said bail is pivotally attached to add key 94, by a stud 104. This bail is mounted for pivotal movement upon a shaft 105 which is mounted in a U-shaped bracket 106, the latter being suitably fastened to the keyboard cover plate 77.

From the foregoing it will be apparent that when solenoid 87 is energized by an electric signal impulse sent from a remotely located departmental machine, its armature 102 will be drawn to the left (Figs. 3 and 5), thus rocking the bail 101 counterclockwise upon its pivot shaft 105, which in turn depresses the add key 94 to close motor switch 107 for the motor 108, thereby to start an adding cycle of the machine.

It will be noted (Fig. 3) that the add key 94, for the master machines, projects above the cover 83 of the receiver units, and is supplied with a key button, so that said key can be manually depressed when desired. However, if manual operation of the add, substract, total, and subtotal keys is not desired, the buttons may be omitted and the keys completely concealed by the cover 83 as is the case with secondary machines L to P (Fig. 2), for the sales analysis set-up, or any similar arrangement in which the total and subtotal taking operations of the secondary machines are designed to be solely under the control of a master machine.

It will be observed from Figs. 4 and 5 that armature 109 of solenoid 89 is pivotally connected to one end of a link 110 by a pin 111 and that the other end of such link is pivotally attached to the subtract key 100 by a shoulder bolt 112 and clamp 113, the construction being such that the bolt firmly holds the clamp about the free end of the subtract key. Thus it will be understood that when the solenoid 89 is energized, its armature 109 will be drawn to the left (Fig. 4) and through the link 110 rocks the subtract key 100 counterclockwise on its pivot to initiate a subtract cycle of the master machine.

For the sake of clearness, in the wiring diagram (Fig. 13), presently to be described, separate keys have been shown for controlling the total and subtotal mechanism of the calculating machines, but it will be understood that in the machines illustrated, only one key is used for total and subtotal operations, such key being rocked forwardly for total taking operations and rearwardly for subtotal taking operations. Thus, the solenoids 88 and 90 (Fig. 3) are mounted in opposed relation so that when they are energized, their armatures 114 and 115, respectively, will move in opposite directions. As shown in Fig. 3, a link 116 has one end pivotally connected with armature 114 of solenoid 88 by a pin 117, and its other end pivoted to a clamp 118 by a shoulder bolt 119. This clamp is securely attached to the upper end of combined total and subtotal key lever 96, 98, and it follows, therefore, that when solenoid 88 is energized, its armature 114 will be moved to the left (Fig. 3), and through the link 116 will rock the total and subtotal key lever 96, 98 counterclockwise for a total taking operation. Similarly, energization of solenoid 90 causes its armature 115 to move to the right, and the latter, through a link 90a pivotally connected at its ends to the armature 115 and to the clamp 118, respectively, swings the key lever 96, 98 clockwise to a subtotal taking position. Rightward movement of the link 116 causes its offset portion 116a to engage the leftward contact arm of switch 121 to close the latter. It will be further noted that link 116 has a downwardly projecting finger 120, which serves to close the switch 121 each time the link is moved forwardly by solenoid 88 during a total taking cycle, for a purpose which will be described in connection with the description of the wiring diagram, Fig. 13.

Control box G

As shown in Figs 15 to 18, the control box G comprises a casing 130 having a keyboard assembly 132 suitably mounted therein. Each of a plurality of control keys J is provided with a key stem 134 which is guided in suitable slotted key plates 136 and 137 forming part of the assembly 132. Each of the key stems 134 is provided with a cam portion 138 cooperable with a latching slide 140 and a switch operating slide 141, these slides being suitably guided for longitudinal movement in the keyboard assembly 132. A tension spring 142 normally holds the latching slide 140 in its rearward position, whereas the switch operating slide 141 is moved rearwardly by resilient switch arm 144 forming part of a switch 146 (Fig. 16). It will be noted that the control keys J are divided into two banks, one bank including a release key 149 and minus and plus control keys 150 and 151 for the second receiving unit, and minus and plus keys 152 and 153 for the first receiving unit. The keys 149 to 153 are not utilized in the operation of the system shown in Fig. 1, but will be referred to hereinafter in connection with the description of the system of Fig. 2.

The right-hand bank of control keys J comprises subtotal and total keys 154 and 155 for the second receiving unit and subtotal and total keys 156 and 157 for the first receiving unit. It will be noted from Fig. 17 that the bank of keys 154 to 157 is mounted in the keyboard assembly 132 in the same manner as the keys 149 to 153, but that the lower slide 141 for this bank of keys does not operate a switch and, in fact, is a nonoperating member. Each of the keys 150 to 157 is adapted to close a pair of switches and to hold such pair of switches closed as long as the key is latched in depressed position. As best shown in Fig. 13, the key 150, upon depression, closes switches 158 and 159; key 151 closes switches 160 and 161; key 152 closes switches 162 and 163; key 153 closes switches 164 and 165; key 154 closes switches 166 and 167; key 155 closes switches 168 and 169; key 156 closes switches 170 and 171, and key 157 closes switches 172 and 173. The release key 149 operates in a customary manner to shift the latching slide 140 forwardly to release such of the keys 150 to 153 as may have been latched in depressed position. The latching slide 140 for the keys 154 to 157 is adapted to be operated, to release any depressed keys, by means of a solenoid 174 having a plunger 176. The plunger 176 is connected to the depending arm 178 of a lever pivoted on a rod 180 and having a pair of arms 182 and 183. The depending lever arm 178 is normally held in the position shown in Fig. 17, with its arm 183 in abutment with the slotted key guide plate 137, by a tension spring 184. The other arm 182 is adapted to engage the rearwardly projecting end of the latching slide 140 to move the latter to key releasing position whenever the solenoid 174 is energized. The keys 154 to 157, as well as the keys 149 to 153, are returned to normal position in a conventional manner, as by coil springs 186.

Coupling Switches

As best shown in Fig. 5, each of the sending and receiving units is provided with a solenoid 190 having a plunger 192 which is resiliently urged to the right (Fig. 5) by a tension spring 194. Rigidly secured to the plunger 192 is an arm 196 carrying an insulating strip 198 projecting upwardly so as to engage the rearmost of a plurality of flexible switch arms 200. These switch arms 200, as well as a rigid switch member 204, are insulated from one another and mounted in a suitable supporting bracket 202. When the solenoid 190 is energized, the insulating strip 198 flexes all of the switch arms 200 so as to bring them into contact with one another against the rigid switch member 204. As will appear hereinafter these switch arms 200 and 204 are effective to couple the numeral key operating solenoids 74 in their operating circuits.

Circuit diagram and operation of the system shown in Figure 1

In describing the circuit diagram of Fig. 13, it will be assumed that departmental machine B has had a number of amounts entered therein by the clerk, and that it is desired to clear this machine and transfer the total contained therein into the master machine A. Reference may be had to the timing diagram of Fig. 20, which shows the sequence of operation of various parts of the apparatus.

It will be noted that one terminal of each of the solenoids 74 for the keys 0 to 9 of the master machine A, as well as of the departmental machines B and C, are respectively connected by conductors 210 to 219, inclusive. The bus bars 13 of the master machine A and the departmental machines B and C are similarly respectively connected to the conductor 210 to 219.

The various controlling and controlled electrical elements of the master machine A and departmental machines B and C are connected through conductors 220 to 231, inclusive. The conductors 210 to 231 form the cable F.

To accomplish the transfer of the total contained in departmental machine B to the master machine A, the operator of the master machine depresses key 157, thereby closing switches 172 and 173. Closure of the switch 172 completes a circuit from the grounded terminal of the switch 172, through conductor 234, solenoid 190 of machine A, and switch 68, to the positive side of the line conductor 231. The machines and control circuits may be operated either from an alternating current or from a direct current source, but for convenience in the description of the wiring diagram, and of the operation of the apparatus, it will be assumed that the machines are controlled by direct current.

Depression of the key 157 also closes switch 173 and thereby connects conductor 223 to ground, completing a circuit from the positive line conductor 231 through solenoid 90 of machine B. Energization of the solenoid 90 conditions the departmental machine B for a total taking operation and initiates this operation in the following manner: As indicated by the dash lines in Fig. 13, the solenoid 90 for the total key 96 closes switches 107 and 121. The switch 121 is closed by the projection 120 on link 116, while switch 107 is closed through a suitable linkage operated by the total and subtotal key 96, as is more fully disclosed in the prior patent to Thomas O. Mehan No. 2,362,709. The switch 107 is then locked in closed position throughout the remainder of the machine cycle, as is more fully disclosed in the copending application of Thomas O. Mehan, Serial No. 566,980, filed December 7, 1944, which shows the locking means for the total key. Locking of the total key in its operated position maintains the switch 107 closed throughout a complete operating cycle. Closure of the switch 107 energizes the driving motor 236 of the departmental machine B through the following circuit: from positive line conductor 231 through switch 107, motor 236, and switch 43 to ground. The energization of solenoid 90, through its operation of the total key 96 of the departmental machine B, conditions the latter for a total taking operation by the usual adding machine mechanism. The departmental machine B therefore starts on a total taking cycle. At the end of the forward oscillating stroke of the main shaft 75 (Fig. 4) the pin 65 contacts the extension 64 and rocks the bail 67 counterclockwise, thereby opening switch 68 and closing switch 69.

Closure of the switch 69 results in the completion of a circuit from the positive line conductor 231, through switches 69 and 121, the winding of solenoid 16, switches 36 and 41, to ground. The solenoid 16 is thus energized and though operation of the pawl 28 commences moving the sensing carriage 34 one step to the right. Upon this initial movement of the sensing carriage 34 the insulating stop arm 42a moves away (Fig. 12), thereby permitting the switch 43 to open and thus break the energizing circuit for the motor 236. The motor will thereupon coast to a stop with the racks 50 in positions representing the total. The spring bias of the switch arms for the switches 41, 43, and 44, is such that when the stop arm 42a moves away from the right-hand arm of switch 43 the latter will assume a position such that both switches 43 and 44 are open. As soon as the solenoid plunger 19 moves into the winding of the solenoid 16, arm 37 (Fig. 8) moves away from the insulated arm of switch 36 and opens the circuit through the winding of said solenoid. The solenoid 16, under the control of the switch 36, thus continues to operate as previously described.

The sensing carriage 34 is thereby moved in step by step relation to bring the V-shaped portions 12a of the brushes 12 successively in alignment with the insulating lugs 15 which are secured to the actuating racks 50. It will be understood that since the total taking cycle is interrupted at the end of the clockwise operation of the main shaft 75, the actuator racks 50 will be differentially positioned in accordance with the total entered into the accumulator and thus the total accumulated will in effect be registered by the positions of the insulating lugs 15. As a result, as the sensing carriage is stepped to the right by the solenoid 16, the brushes 12 will be operated in a sequence corresponding to the total which was entered into the accumulator.

For example, assuming that the total in the accumulator amounted to $2.56, the six leftmost racks 50 would be in zero position and as the V-shaped portion 12a of the brush 12 corresponding to "0" engages these lugs, a circuit is completed from ground through the common bus bar 13, its brush 12, through the "0" position brush 12 and its associating bus bar 13, through conductor 210, and through the solenoid 74 associated with the "0" key of the master machine A. Thus, as successive contacts are made by the "0" brush 12 of the departmental machine, the "0" solenoid 74 of the master machine will be correspondingly energized, i. e., in the illustrative example, six times. Such operation of the zero solenoid of the master machine will not have any ultimate effect, since it will merely set up the zero stop pins in the stop pin carriage for the master machine, and since the master machine is equipped with zero elimination mechanism whereby zeros in orders higher than that in which the first significant figure appears are not printed.

As the sensing carriage reaches the hundreds position, the brush 12 corresponding to the "2" position will engage the insulating lug 15 of the hundreds rack 50, and will be operated thereby, completing a circuit similar to that previously described except that it will be through the conductor 212 and will energize the solenoid 74 beneath the "2" key of the master machine A. Similarly in the example given, the tens digit "5" and the units digit "6" will result in successive energization of the solenoids 74 associated respectively with the "5" and "6" keys of the master machine, thus completing the transfer of the total from the accumulator of the departmental machine B to the set-up mechanism, i. e., the pin carriage, of the master machine A.

When the sensing mechanism is thus moved to the units rack sensing position its insulating arm 42 engages the left contact arm of switch 43 to close switches 43 and 44 and to open switch 41. Closure of the switch 43 results in reenergization of the motor 236 so that departmental machine B may complete the remainder of its total taking cycle. Closure of the switch 44 completes a circuit which may be traced from ground through switches 43 and 44, conductor 230, solenoid 87 of the master machine A, switch 68 of machine A, and hence to the positive line conductor 231. Energization of the solenoid 87 will, by effectively depressing the add key 94 of the master machine, cause the latter to execute an adding cycle thereby entering the total sensed from the departmental machine (e. g., $2.56) in the accumulator of the master machine.

It will be recalled that when the sensing carriage completed its rightward movement, it also opened switch 41 to thereby open the circuit through which the solenoid 16 was energized. The sensing carriage will therefore remain at rest temporarily.

As the departmental machine B completes its total taking cycle the pin 65 (Fig. 4) engages the extension 63, thereby swinging the shaft 49 clockwise (Fig. 4) and raising the rearwardly projecting end of the arm 48 sufficiently to engage the ears 31 and 32 of the pawls 28 and 30 and disengage these pawls from the teeth of rack 33. When thus released, the sensing carriage 34 moves leftward to the position in which it is shown in Fig. 8, by virtue of the energy stored in the tension spring 45. It will be recalled that the closure of the switch 44 resulted in connecting conductor 230 to ground through the switches 43 and 44. In addition to energizing solenoid 87, as previously described, connecting the conductor 230 to ground, also energized the key release solenoid 174, which, through the mechanism shown in Fig. 17, released the depressed key 157. Thus both the master machine A and the departmental machine B are restored to normal.

To effect a subtotal taking operation in the departmental machine B, the subtotal key 156 will be depressed and the taking of a subtotal will be accomplished in the same manner that the total taking and transfer operation is effected, except that the subtotal solenoid 88 of the departmental machine B will be energized instead of energizing the total key operating solenoid 90. The energization of the subtotal solenoid 88 will cause the departmental machine to go through a subtotal taking operation during the course of which the subtotal will be sensed from the positions of the racks when they are arrested by the zero stop mechanism of the accumulator, and this subtotal will be entered as an amount to be added in the set-up mechanism of the master machine. Thereafter, departmental machine B will complete its subtotaling operation and the master machine will be caused to execute an adding operation.

Totals and subtotals may be taken from the departmental machine C and transferred into the master machine A in the same manner by depressing the appropriate key 154 or 155. While the diagram of Fig. 13 does not show the circuits for departmental machines D and E, it will be understood that the circuits for these latter machines will be of the same character as those for the machines A, B and C, and will operate in the same manner. The control keyboard G will be provided with the number of control keys J necessary to effect the control of all of the departmental machines employed in any particular installation. Since the operation of all departmental machines will be identical with that of machine B, further detailed description of the operation of the system in transferring totals and subtotals from the departmental machines C, D, and E, etc., to the master machine A is believed to be unnecessary.

*Circuit diagram and operation of the system shown in Figure 2*

As previously pointed out, the system of Fig. 2 employs a master machine K in which amounts may be entered and which has a control box Q with keys R whereby the secondary adding machine units L, M, N, O, and P may be selected to have the amounts which have been set up in the master machine entered in the selected secondary units, either in an additive or a subtractive manner.

Let us assume that it is desired to enter the amount $358.00 additively in the secondary unit L and subtractively in secondary unit or machine M. The operator enters the amount $358.00 in the master machine K in the usual manner and depresses the control keys 150 and 153. Depression of the key 153, by closing switch 164, connects conductor 227 to ground and thus completes a circuit from the positive line conductor 231 through closed switch 68 of machine L, solenoid winding 190, conductor 227, and switch 164, to ground. The energization of solenoid 190 connects all of the flexible switch arms 200 to the rigid switch arm 204, which it will be noted is permanently connected to the positive line conductor 231. Thus each of the windings of the solenoids 74 of the secondary machine L has one terminal connected to the positive line conductor.

In a similar way depression of key 150, by closing switch 158, completes a circuit, including conductor 224, to energize the solenoid 190 of the secondary machine M, and thereby conditions the solenoids 74 associated therewith for energization, by connecting one terminal of each of them to the positive line conductors 231.

Depression of the key 153 also closes switch 165 and thus partially completes a circuit from the open switch 44 of the master machine K, through conductor 240, switch 165, conductor 229, to the winding of solenoid 87 associated with the add key 94 of the secondary machine L.

In a similar manner, depression of the key 150, by its closure of switch 159, partially completes a circuit from the open switch 44, conductor 240, switch 159, and conductor 225 to the solenoid 89 associated with the subtract key 100 of the secondary unit M.

After entering the amount ($358.00) in the master machine and selectively operating the control keys 150 to 153, the operator depresses either the add key 94 or the subtract key 100 of the master machine K, depending upon whether the amount is to be added or subtracted in the master machine. Upon depression of either of these keys the motor control switch 107 is closed, thereby energizing the motor 236 of the master machine K, through the following circuit: from positive line conductor 231 through switch 107, motor 236, and switch 43, to ground. Assuming that the add key 94 of the master machine was depressed, the master machine will then commence an adding cycle and will continue through the forward oscillatory stroke of the main shaft 75 thereof until the shaft 49 (Fig. 4) is rocked counterclockwise to open switch 68 and close switch 69. When the switch 69 is closed the solenoid 16 is energized and the sensing carriage of the master machine is moved to the right. As the sensing carriage moves to the right, the insulating arm 42a moves away from the right-hand arm of the switch 43, permitting this switch to open, thereby opening the circuit to the motor 236 and stopping the operation of the master machine at the point in its cycle at which the racks have moved rearwardly into engagement with the set pins of the stop pin carriage. The positions of the racks thus represent the amounts set up in the master machine.

The solenoid 16 is, however, alternately energized and deenergized by the operation of its switch 36, stepping the sensing carriage to the right (Fig. 8) and causing the V-shaped portions of the brushes 12 to engage the insulating lugs 15 of the set racks as the sensing carriage progresses to the right. In the assumed example ($358.00) the first four racks 50 of the master machine K would be in "0" position and an impulse would therefore be transmitted from ground through grounded bus bar 13 and the brush 12a in contact therewith, the "0" brush 12 and its associated bus bar 13, conductor 210, to the solenoids 74 associated respectively with the "0" keys of the secondary units L and M, and to the positive line conductor through coupling switches 200 and 204. The stop pin carriages of the secondary machines L and M will therefore have zeros entered in them, but since these zeros will be in higher orders than the first significant digit entered in these machines, such operation of the zero keys stems of these machines will not have any effect. However, as the sensing brushes 12 of the master machine K pass its ten-thousands rack 50, the third brush 12 will be forced into contact with its associated bus bar 13 and the latter, and the conductor 213 connected to such bus bar, will thereby be connected to ground. As a result the solenoid 74 associated with the "3" keys of the secondary machines L and M will be energized. Similarly, as the sensing carriage of the master machine K passes the thousands, hundreds, tens, and units rack 50, the solenoids 74 for the "5," "8," and "0" keys of both the secondary machine L and M will be energized, thus completing the entry into the secondary machines of the amount originally set up in the master machine K.

When the sensing carriage of the master machine has thus completed its movement to the right under the influence of its actuating solenoid 16 (Fig. 8), the insulating arm 42 of the sensing carriage engages the leftmost contact arm of switch 43 and closes this switch, thereby completing a circuit to the motor 236 of the master machine. At the same time switch 41 is opened, thereby breaking the circuit through which the solenoid 16 was energized. Switch 44 is also closed, thus connecting the conductor 240 to ground through the switches 44 and 43. This results in completing a circuit from the grounded conductor 240, through switch 165, conductor 229, and solenoid 87 of machine L, to the positive line conductor 231. Energization of the solenoid 87 causes effective operation of the add key 94 and hence closure of the motor control switch 107 of the secondary machine L, causing the latter to operate through an adding cycle in a normal manner. The master machine K is provided with the usual one revolution clutch mechanism which operates, upon completion of a cycle, to deenergize the motor 236 and to break the driving connection between the motor and the main shaft. The switch 107, as previously mentioned, remains closed throughout the machine cycle, and the circuit for the motor 236 is broken by opening switch 43 when the insulating member 42a of the sensing carriage 9 moves to the right. When the carriage 9 has moved to its extreme rightward position, the insulating part 42 thereof engages the contact arm of switch 43 and recloses the latter, thereby energizing the motor 236 to cause the latter to operate the machine through the remainder of its cycle. The manner in which the one revolution clutch mechanism deenergizes the motor 236 is more clearly disclosed in the aforesaid prior Patent No. 2,362,709.

Similarly, the grounded conductor 240 is connected through switch 159 and conductor 225 to the solenoid 89 of the secondary machine M, thereby in effect operating the subtract key 100 thereof, closing its motor control switch 107, and causing a secondary machine M to operate in a normal manner through a subtract cycle.

It is thus seen how an amount entered into the master machine K, either by being added or subtracted, is added in the secondary unit L and subtracted in the secondary unit M. It will be noted that the control box Q of the master machine K is provided with four rows of six keys each. The uppermost key of each vertical row is a release key such as key 149 of Figs. 15 and 16, whereas the remaining keys are provided for controlling adding, subtracting, subtotal taking, and total taking operations, selectively in each or any of the five secondary units L to P. This in a system such as shown in Fig. 2 having five secondary units, a single amount may, by a single set-up mechanism, be entered substantially simultaneously, either in an additive or a subtractive sense, in any one of the five secondary units, as well as in the master unit. It will be understood that the five secondary units shown in Fig. 2 are intended as illustrative of any required larger number of units which may be coupled in the system, suitable provision being made by increasing the number of control keys in the control box Q to make such additional units selectively controllable.

It will be noted that each of the secondary units is preferably provided with a printing mechanism to make a printed record on its tape in the usual manner.

If, after the desired amounts have been entered in the appropriate secondary units and a recapitulation total or subtotal of the amounts registered in each secondary unit is desired, such total or subtotal taking may be accomplished in the same manner as above described with reference to the operation of the system of Fig. 1.

Thus, a bookkeeper may readily distribute or "post" items among several different accounts represented by the secondary units L to P and said distribution of the amounts is accomplished simultaneously in a plurality of preselected units. At the conclusion of such posting operations the operator will have available record strips showing the items and totals for each unit, and, in addition, may obtain grand totals as a result of the transferring of totals from selected secondary units to the master unit. The system is very flexible and may be applied to a large variety of accounting, record keeping, and statistical problems.

While we have shown and described particular embodiments of our invention, it will be apparent that numerous variations and modifications thereof may be made without departing from the underlying principles of the invention. We therefore desire, by the following claims, to include within the scope of our invention all such variations and modifications by which substantially the results of our invention may be obtained through the use of substantially the same or equivalent means.

We claim:

1. In a mutiple adding and listing machine system for accounting purposes, the combination of a master adding and listing machine of the ten-key type, said machine including ten manually operable elements for setting up amounts to be added by said master machines, electromagnetic means for selectively operating said elements, a plurality of departmental adding and listing machines, an amount set-up keyboard mechanism associated with each of said departmental machines, each of said departmental machines having an accumulator and differentially movable actuators for entering amounts in said accumulator and adapted to be differentially positioned by said accumulator in the taking of totals and subtotals, said last named actuators being movable to rest positions indicative of the total of the amounts registered in their associated accumulator, electrical means for sensing the positions of said actuators while they are at rest, and means to operate said electromagnetic means by said electrical means, thereby to set up in said master machine the total of the amounts entered in said departmental machine.

2. In an accounting system, the combination of a master calculating machine and a plurality of secondary calculating machines, each of said secondary machines including amount and total printing mechanisms, means to select one or more of said secondary machines for entry of amounts therein, electrical means for transferring amounts entered in said master machine to one or more of said secondary machines, and means manually controlled from said master machine for electrically transferring to said master machine the totals of the amounts entered in said secondary machines.

3. In an accounting system having a master adding and subtracting machine and a plurality of departmental adding and subtracting machines, keys associated with said master machine for selecting one of said departmental machines and determining the character of the operation to be performed by the selected departmental machine, electrical circuits completed by said selecting and operation determining keys, and means forming parts of each of said departmental machines and controlled by said electrical circuits for causing said departmental machines to perform the selected operation and upon completion of such operation to effect restoration of said keys.

4. In an adding machine system having a master machine and a secondary machine remotely controlled from the master machine each of said machines having an amount set-up mechanism and a plurality of accumulator actuators, the combination of a sensing means forming part of said secondary machine to provide electrical signals corresponding to the positions of the actuators thereof, means operated by said electrical signals to cause the entry of amounts in the set-up mechanism of said master machine, corresponding to the positions of the actuators of said secondary machine, and means to render said sensing means of said secondary machine ineffective when said secondary machine is conditioned for the entry of amounts into its set-up mechanism.

5. In a remote control system having a master adding machine and a secondary machine each having accumulator actuators, means for selecting said secondary machine for operation, means in said secondary machine for sensing the positions of the actuators thereof and transmitting electrical signals to said master machine corresponding to the positions of the actuators in the secondary machine, and means controlled from said master machine and associated with said secondary machine to render ineffective the sensing means while signals are being transmitted from said master machine to said secondary machine.

6. In an adding machine having accumulator actuators, a carriage carrying electrical contacts for sensing the positions of said actuators, and means for causing said carriage to traverse said racks; said last named means comprising a solenoid, a circuit for energizing said solenoid including a first switch, an actuator for said switch, and a lost motion connection between the plunger of said solenoid and said actuator whereby said switch will be opened only after said solenoid plunger has traveled a substantial distance, and will be closed prior to the return of said solenoid plunger to its unactuated position.

7. In an adding machine having a plurality of differentially movable actuators, a sensing means to provide electrical signals corresponding to the settings of said actuators, comprising a carriage having a plurality of switch actuators associated therewith for cooperation with said actuators, and means to move said carriage transversely with respect to said actuators; said last named means comprising a solenoid and plunger, a pawl and ratchet driving connection between said solenoid plunger and said carriage whereby said carriage is moved one step upon each energization of said solenoid, an energizing circuit for said solenoid including a switch closed each time said solenoid plunger moves substantially a maximum extent outwardly from the solenoid and opened when the inward movement of the solenoid plunger is substantially completed, and additional means in series in said solenoid energizing circuit for opening said circuit upon completion of the travel of said carriage in one direction.

8. In an adding machine for transmitting electrical signals corresponding to the positions assumed by its actuator racks, electric motor means for driving said adding machine, means for initiating an operating cycle by the energization of said motor, means for deenergizing said motor after said racks have stopped at their differential positions, electrical means for successively sensing the positions of said racks, and means operated by said sensing means immediately after sensing the positions of said racks to energize said electric motor and cause the adding machine to complete its operating cycle.

9. The combination set forth in claim 8 in which said sensing means is returned to normal position shortly prior to the completion of the operating cycle of said motor, and subsequent to the return of said racks to normal position.

THOMAS O. MEHAN.
HUNTER E. HOOE.

REFERENCES CITED

The following references are of record in the file of this patent:

UNITED STATES PATENTS

| Number | Name | Date |
| --- | --- | --- |
| 939,289 | Muzzy | Nov. 9, 1909 |
| 988,327 | Foster | Apr. 4, 1911 |
| 997,983 | Foote | July 18, 1911 |
| 1,005,555 | Kettering | Oct. 10, 1911 |
| 1,039,988 | Molina | Oct. 1, 1912 |
| 1,189,269 | Lorimer | July 4, 1916 |
| 1,569,450 | Bohlman | Jan. 12, 1926 |

(Other references on following page)

UNITED STATES PATENTS

| Number | Name | Date |
|---|---|---|
| 1,834,561 | Watson | Dec. 1, 1931 |
| 1,836,671 | Langford | Dec. 15, 1931 |
| 1,932,220 | Kottmann | Oct. 24, 1933 |
| 1,942,106 | Kottmann | Jan. 2, 1934 |
| 1,991,515 | Paris | Feb. 19, 1935 |
| 2,142,252 | Nunan | Jan. 3, 1939 |
| 2,224,774 | Tauschek | Dec. 10, 1940 |
| 2,293,127 | Fishack et al. | Aug. 18, 1942 |

FOREIGN PATENTS

| Number | Country | Date |
|---|---|---|
| 270,044 | Great Britain | May 6, 1927 |
| 331,182 | Great Britain | June 24, 1930 |